United States Patent [19]

Aoyagi et al.

[11] Patent Number: 4,995,027
[45] Date of Patent: Feb. 19, 1991

[54] AUTOMATIC LOADING DISC PLAYER

[75] Inventors: Yoshio Aoyagi; Toshiyuki Kimura; Yoshinori Yamada; Fumio Endo; Kiyoshi Morikawa, all of Saitama, Japan

[73] Assignee: Pioneer Electronic Corporation, Tokyo, Japan

[21] Appl. No.: 271,839

[22] Filed: Nov. 16, 1988

[30] Foreign Application Priority Data

Mar. 5, 1988 [JP] Japan .................................. 63-52178
Mar. 5, 1988 [JP] Japan .................................. 63-52179
Mar. 5, 1988 [JP] Japan .................................. 63-52180

[51] Int. Cl.⁵ ...................... G11B 33/02; G11B 05/016
[52] U.S. Cl. .................................. 369/77.1; 369/75.2; 360/99.06
[58] Field of Search ............... 369/75.1, 75.2, 77.1, 369/79, 34, 35, 36, 37, 38; 360/99.02, 99.03, 99.06, 99.07

[56] References Cited

U.S. PATENT DOCUMENTS 4,098,510 7/1978 Suzuki et al. ................... 274/39 R
4,733,314 3/1988 Ogawa et al. .................. 369/77.2 X

FOREIGN PATENT DOCUMENTS

3513039 10/1985 Fed. Rep. of Germany ..... 369/75.2

Primary Examiner—Stuart S. Levy
Assistant Examiner—Kenneth B. Wells
Attorney, Agent, or Firm—Sughrue, Mion, Zinn, Macpeak & Seas

[57] ABSTRACT

An automatic loading disc player comprising a detection system for preventing mistaken insertion of a compact disc which is smaller than the conventional disc. The disc player comprises conveying rollers for conveying the disc to a disc playing position and returning the disc to a disc insertion position. The disc player further comprises a first detection means provided near the conveying rollers for detecting the presence or absence of a data recording disc, a second means for detecting when a data recording disc is loaded at the disc playing position, and a control means for controlling the driving of the conveying rollers in the forward or reverse direction, the control means operating to stop the driving of the conveying rollers in the forward direction when, in loading a data recording disc, the detection of the presence of the disc by the first detecting means is interrupted before the second detecting means detects the completion of loading of the disc.

6 Claims, 7 Drawing Sheets

AUTOMATIC LOADING DISC PLAYER

BACKGROUND OF THE INVENTION

1. Field of the Invention

This invention relates to automatic loading disc players, and more particularly to an automatic loading disc player of slide-in type in which a data recording disc (hereinafter referred to as "a disc") is loaded therein and unloaded therefrom by means of conveying rollers.

2. Background Art

In an automatic loading disc player of this type, a pair of conveying rollers vertically disposed near the disc insertion opening are rotated in a forward direction to move a disc to the disc-playing position, and rotated in a reverse direction to return the disc to the disc insertion opening. In general, only discs having a predetermined diameter can be played. A conventional digital audio disc player is so designed as to play 12-cm compact discs (hereinafter referred to as CDs). However, with the recent advent of the 8-cm CD, 8-cm CD's have been mistakenly inserted into the above-described automatic loading disc player and have been unable to be ejected therefrom due to its relatively small sized as compared to the conventional 12-cm CD.

SUMMARY OF THE INVENTION

In view of the foregoing, an object of this invention is to provide an automatic loading disc player which is so designed that, when a disc having a smaller diameter than that which the player is designed to accommodate is inserted therein, the smaller disc is automatically ejected before it is received in the player body.

According to a first embodiment, an automatic loading disc player of the invention comprises: first detecting means for detecting the presence of a disc in the disc insertion opening; and second detecting means disposed proximate the conveying rollers provided near the disc insertion opening, for detecting the presence or absence of the disc. In the disc player, in response to a disc loading instruction the conveying rollers are rotated in the forward direction when the first detecting means detects the presence of the disc, and the disc loading operation is suspended if the presence of the disc is not detected by the second detecting means for a predetermined period of time after the forward driving of the conveying roller is started.

According to another embodiment of the invention, a first detecting means for detecting the presence or absence of a disc is provided near conveying rollers disposed proximate to the disc insertion opening, and second detecting means for detecting the completion of loading a disc to the disc-playing position is provided, so that when, in loading a disc, the detection of the presence of the disc by the first detecting means is interrupted before the second detecting means detects the completion of loading the disc, the disc loading operation is suspended.

According to a further embodiment of the invention, a pair of disc detecting means for detecting the presence or absence of a disc are provided proximate to the disc insertion opening in such a manner that they are spaced from each other by a predetermined distance in a direction perpendicular to the direction of insertion of a disc, and the disc inserted into the disc insertion opening is conveyed into the player body only when the two disc detecting means simultaneously detect the presence of the disc.

DETAILED DESCRIPTION OF THE PREFERRED EMBODIMENTS

A first preferred embodiment of this invention will be described in detail with reference to FIGS. 1-3 of the accompanying drawings.

Figure 1:
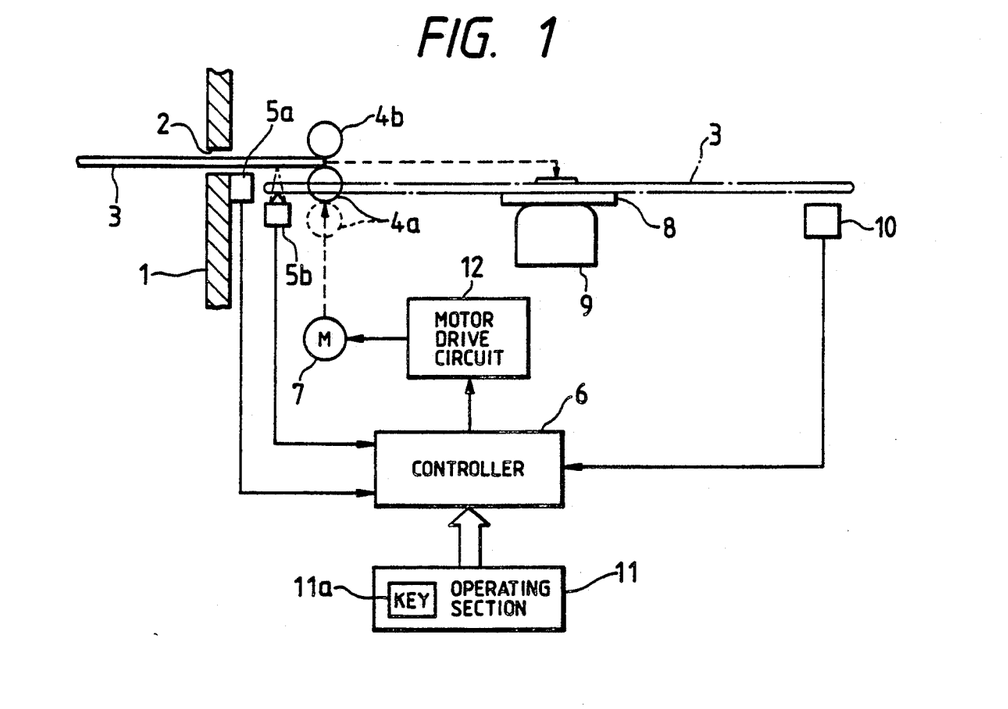
FIG. 1 is an explanatory diagram showing the arrangement of a first embodiment of an automatic loading disc player according to this invention.
Figure 2:
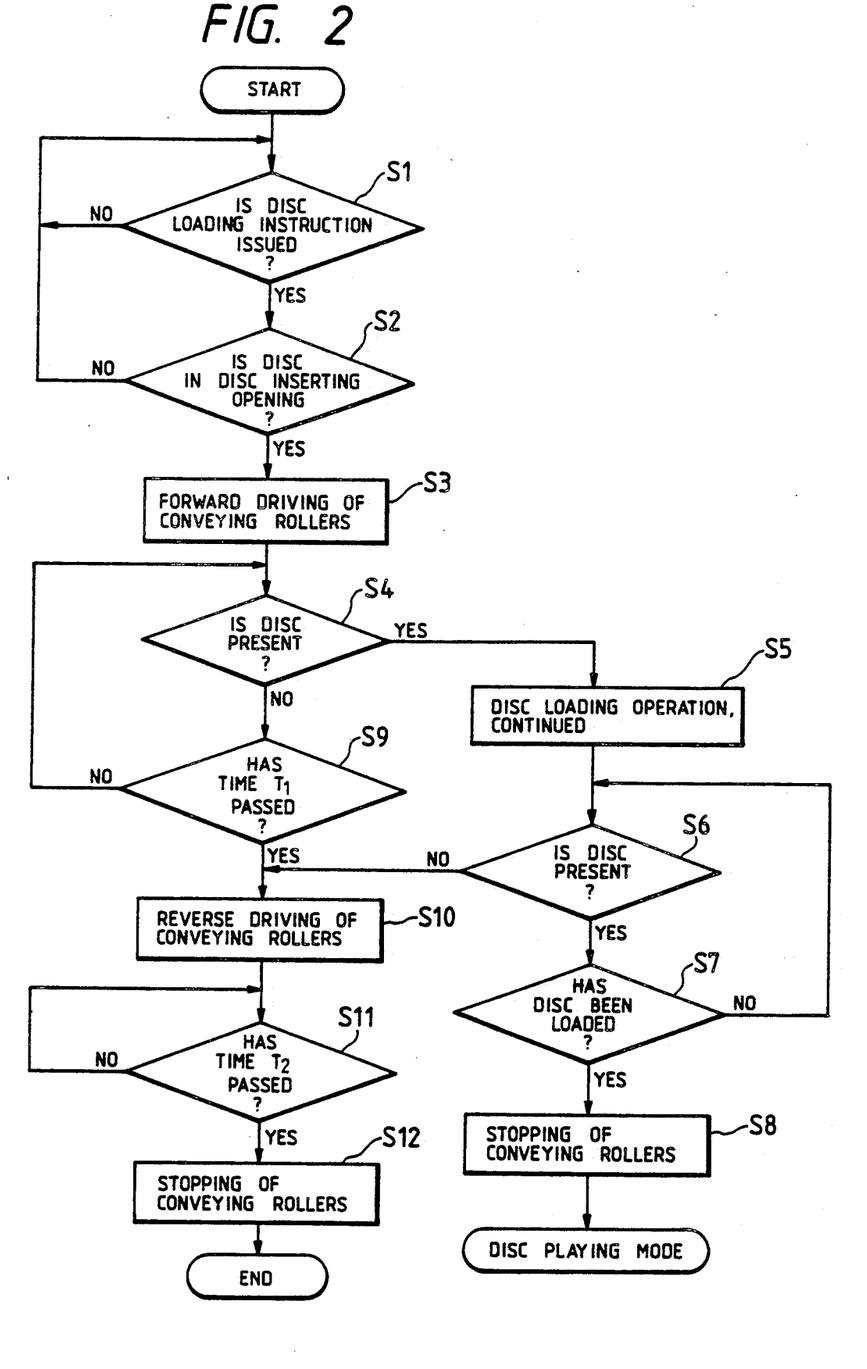
FIG. 2 is a flow chart showing the loading operation control procedure carried out by a processor in the disc player shown in FIG. 1.

FIG. 1 is an explanatory diagram showing the arrangement of one example of an automatic loading disc player according to the invention. The disc player is a 12-cm CD player. When a disc 3 is inserted into a disc insertion opening 2 formed in the front panel 1 of the player body as shown in FIG. 1, a pair of upper and lower conveying rollers 4a and 4b, vertically disposed near the disc insertion opening 2, are rotated in a forward direction to convey the disc 3 into the player body. A door (not shown) is swingably provided for opening and closing the disc insertion opening 2. A door opening detecting sensor 5a for detecting when the door is opened is disposed near the door. The sensor 5a also serves as first detecting means for detecting the presence of a disc 3 in the disc insertion opening 2. The output of the sensor 5a is applied to a controller 6. Second disk detecting sensor 5b is provided between the conveying roller 4a and the disc insertion opening 2. The disc detecting sensor 5b detects when a disc 3 has been inserted into the disc insertion opening 2 or ejected therefrom; that is, it detects the presence or absence of a disc 3 between the conveying roller 4a and the disc insertion opening 2. The output of the disc detecting sensor 5b is supplied to the controller 6. The disc detecting sensor 5b may be a non-contact type photosensor. The pair of conveying rollers 4a and 4b are rotated in opposite directions by a loading motor 7 to convey the disc 3 to a disc-playing position or to a disc insertion position. This loading operation is carried out by the conveying rollers 4a and 4b and a driving mechanism (not shown) cooperating with those rollers.

The disc 3, after having been conveyed into the player body by the conveying rollers 4a and 4b, is moved downwardly by the driving mechanism (not shown) when the center of the disc is located above the center of the turntable 8, so that the disc is placed on the turntable; that is, in the disc-playing position. The disc 3 thus placed is rotated by a spindle motor 9. When the disc 3 is moved downwardly as described above, at least the lower conveying roller 4a is moved downwardly to the position indicated by the broken line in FIG. 1 in association with the driving mechanism so as not to obstruct the rotation of the disc 3. When the disc 3 is placed at the disc-playing position as described above, the driving mechanism activates a loading-completion detecting sensor 10 for detecting the completion of placing the disc 3 at the disc-playing position. The sensor 10 may be, for instance, a mechanical switch. The output of the sensor 10 is applied to the controller 6.

The controller 6 comprises a micro-computer including a processor, ROM (read-only memory) and RAM (random access memory). In response to the outputs of the door opening detecting sensor 5a, the disc detecting sensor 5b, the loading completion detecting sensor 10 and a disc loading instruction outputted with a disc loading instruction key 11a in an operating section 11, the controller 6 controls the loading motor 7 through a motor drive circuit 12, to rotate the pair the conveying rollers 4a and 4b in the forward or reverse direction; that is, to control the loading operation. When the disc 3 is at the disc-playing position, the disc detecting sensor 5b detects the presence of the disc 3.

The loading operation control procedure carried out by the processor in the controller 6 will be described with reference to a flow chart of FIG. 2.

In response to the disc loading instruction from the disc loading instruction key 11a in the operation section 11 (Step S1), the processor determines from the output of the door opening detecting sensor 5a whether or not the door of the disc insertion opening 2 is open; i.e., whether or not the disc 3 is in the disc insertion opening 2 (Step S2). When it is determined that the disc 3 is in the disc insertion opening 2, the processor instructs the motor drive circuit 12 to drive the conveying rollers 4a in the forward direction to convey the disc 3 into the player body (Step S3). Thereafter, the processor detects the output of the disc detecting sensor 5b to determine the presence or absence of the disc 3 (Step S4). When the presence of the disc 3 is determined, the disc loading operation is continued (Step S5). In the disc loading operation, the processor detects the output of the disc detecting sensor 5b to continuously determine the presence or absence of the disc (Step S6), and detects the output of the loading completion detecting sensor 10 to determine whether or not the disc is at the disc-playing position (Step S7). Upon detection of the completion of loading the disc 3, the processor instructs the motor drive circuit 12 to stop the conveying rollers 4a and 4b, thus accomplishing the disc loading operation (Step S8).

Under this condition, the disc player is operated in a disc operating mode.

When a disc-playing completion signal indicates that the playing of the disc has been finished, or the operating section 11 issues a disc-playing suspending instruction, the processor applies an instruction to the motor drive circuit 12 to drive the pair of conveying rollers 4a and 4b in the reverse direction, to thereby remove the disc from the disc-playing position with the above-described operations performed in the reverse order. When the disc 3 has been completely ejected; that is, when the presence of the disc 3 is not detected by the disc detecting sensor 5b, the processor instructs the motor drive circuit 12 to stop the conveying rollers 4a and 4b, thus terminating the disc removing operation. FIG. 3 shows the positional relationships of the disc with the conveying rollers 4a and 4b, the disc detecting sensor 5b, and the loading completion detecting sensor 10. In FIG. 3, the large circles represent the 12-cm CD; more specifically, the large circle of the solid line represents the 12-cm CD located at the insertion position beside the disc insertion opening 2, the large circle of the one-dot chain line represents the 12-cm CD at the disc-playing position, and the large circle of the broken line represents the 12-cm CD at the ejection position.

Now, the case where an 8-cm CD is inserted into the disc insertion opening 2 will be described. When the disc loading instruction is provided by the disc loading instruction key 11a in the operating section 11 with an 8-cm CD inserted into the disc insertion opening 2 in such a manner that it is not opposing the disc detecting sensor 5b as indicated by the small circle of the two-dot chain line in FIG. 3, Steps S1, S2 and S3 are effected by the processor, so that the disc 3 is conveyed into the player body. Then, the processor senses the output of the disc detecting sensor 5b to determine the presence or absence of the disc (Step S4); however, since the 8-cm CD has been inserted in such a manner that it is not opposing the disc detecting sensor 5b as was described above, the presence of the disc 3 cannot be detected. In this case, the processor detects the lapse of a predetermined period of time $T_1$ (Step S9). When the presence of the disc 3 is not detected in the predetermined period of time $T_1$, the processor determines that an 8-cm CD has been inserted, and applies an instruction to the motor drive circuit 12 to drive the pair of conveying rollers 4a and 4b in the reverse direction (Step S10). Under this condition, the processor detects the lapse of a predetermined period of time $T_2$ (Step S11). When the predetermined period of time $T_2$ has passed, the processor issues an instruction to the motor drive circuit 12 to stop the conveying rollers 4a and 4b (Step S12). Thus, the disc player of the invention is free from the difficulty that, when the operator has inserted an 8-cm CD thereinto, the disc is moved into the player body and cannot be ejected (or removed) therefrom.

Figure 3:
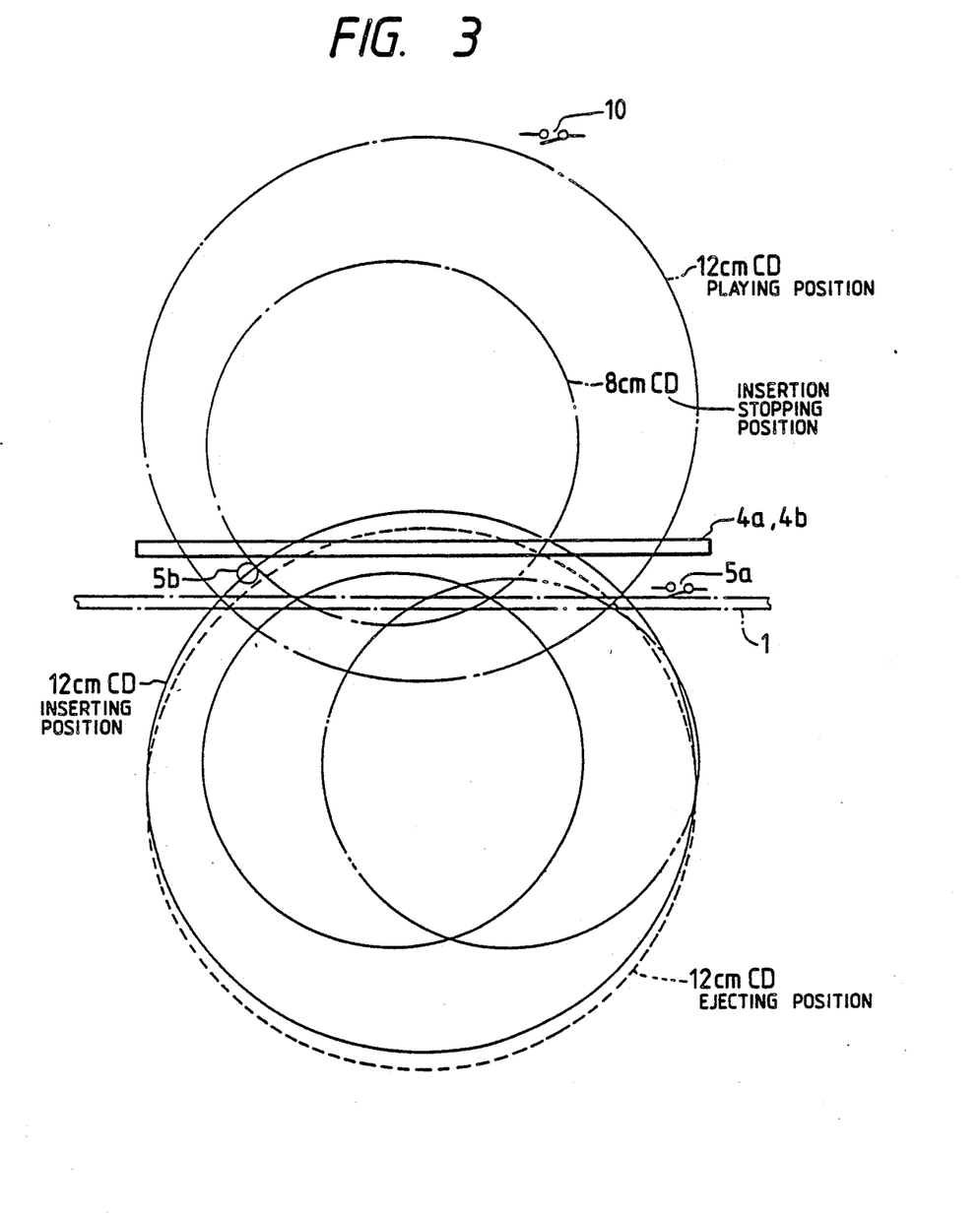
FIG. 3 is an explanatory diagram showing the positional relationships of a disc in the FIG. 1 embodiments with conveying rollers, a disc detecting sensor and a loading completion detecting sensor, in which large circles represent the positions of a 12-cm CD, and small circles the positions of an 8-cm CD.

When the disc loading instruction key 11a of the operating section 11 is operated to issue the disc loading instruction with an 8-cm CD inserted into the disc insertion opening 2 in such a manner that it is close to the disc detecting sensor 5b as indicated by the small circle of the solid line in FIG. 3, Steps S1, S2 and S3 are effected by the processor, so that the disc 3 is moved into the player body. In this case, the disc detecting sensor 5b detects the insertion of the disc, and therefore similarly as in the case of the 12-cm CD, the disc loading operation is continued (Step S5). In the disc loading operation, the processor detects the output of the disc detecting sensor 5b to detect the presence or absence of the disc 3 at all times (Step S6). However, since the disc is smaller in size (diameter), the detection of the presence of the disc by the disc detecting sensor 5b is interrupted before the completion of loading the disc is detected by the loading completion detecting sensor 10, from which the processor determines that an 8-cm CD has been inserted, and Step S10 is effected so that the disc loading operation is suspended and the disc is ejected. Thus, as in the above-described case, the difficulty that an 8-cm CD is moved into the player body cannot be ejected therefrom is eliminated.

In the above-described embodiment, when it is determined that an 8-cm CD has been inserted into the player body, the disc is ejected therefrom. However, when, in the case where an 8-cm CD is inserted in such a manner that it is close to the disc detecting sensor 5b, the presence of the disc is not detected by the disc detecting sensor 5b because it is moved to the position indicated by the small circle of the one-dot chain line, a part of the disc remaining outside the front panel 1; and therefore, the disc player may be so modified that, at this time instant, the disc loading operation is suspended. On the other hand, in the case where as 8-cm CD is inserted in such a manner that it is close to the disc detecting sensor 5b, the disc can be stopped in such a manner that its part appears outside the front panel 1 by setting the predetermined period of time $T_1$ to a suitable value, and therefore similarly as in the above-described case, the disc loading operation can be suspended at this time instant.

Figure 4:
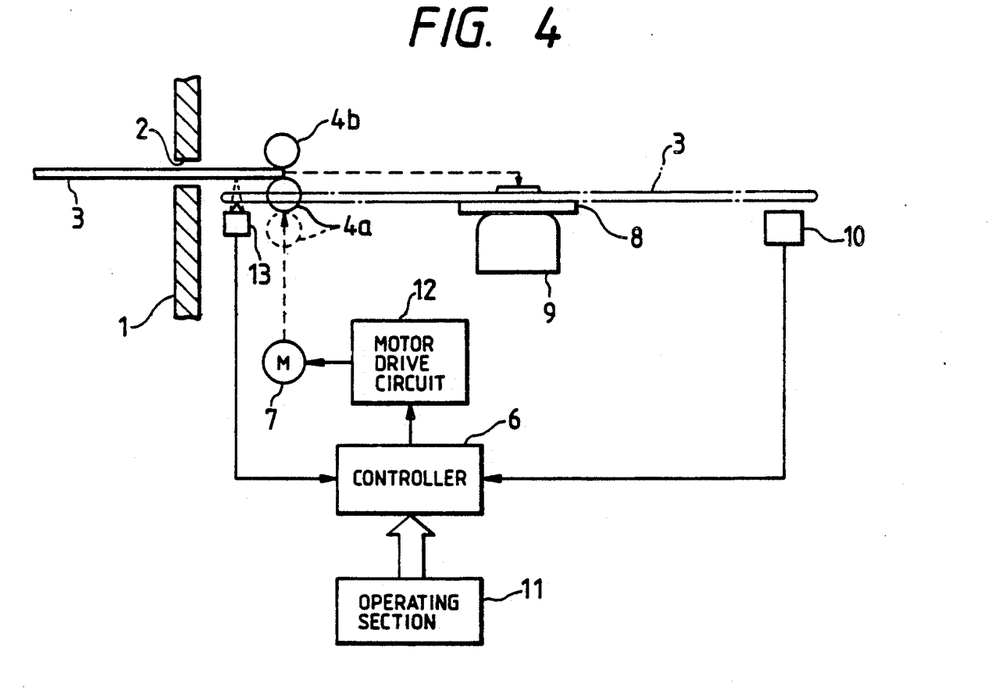
FIG. 4 is an explanatory diagram showing the arrangement of an automatic loading disc player according to a second embodiment of the invention.
Figure 7:
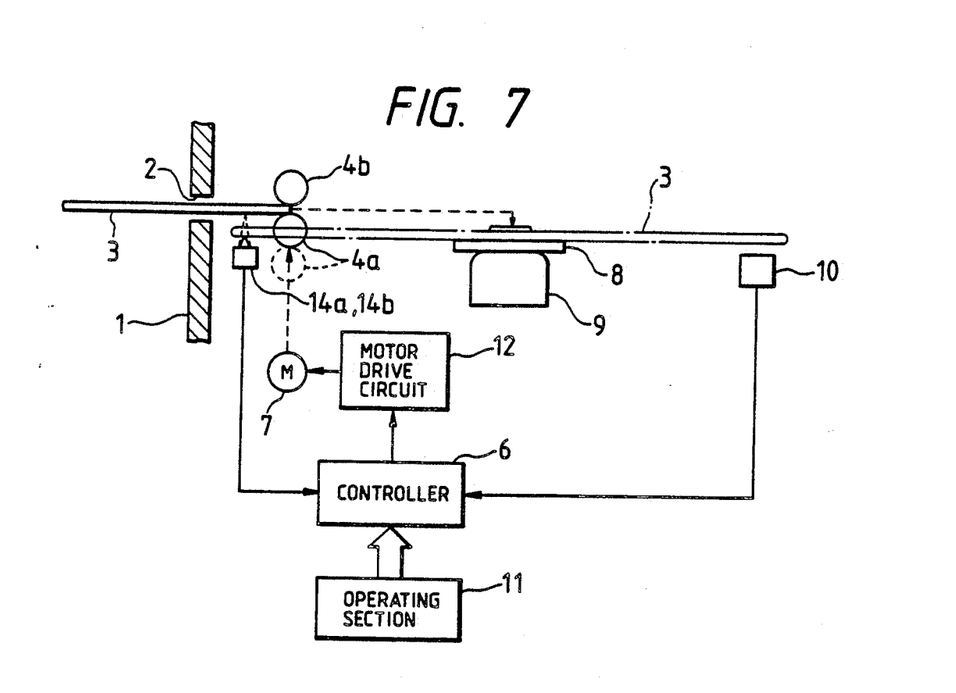
FIG. 7 is an explanatory diagram showing the arrangement of a third embodiment of an automatic loading disc player according to this invention.

In describing the second and third embodiments of the invention, like elements in FIGS. 1, 4 and 7 are designated with common reference numerals.

According to the second embodiment, as shown in FIG. 4 a first detecting means comprising a disc detecting sensor 13 is provided near the conveying rollers 4a next to the disc insertion opening 2. The disc detecting sensor 13 detects the insertion of a disc 3 into the disc insertion opening 2 and the ejection therefrom; that is, the disc detecting sensor detects the presence or absence of a disc 3. The output of the sensor 13 is applied to a controller 6. The disc detecting sensor 13 may be a non-contact type photosensor.

In response to the outputs of the disc detecting sensor, the loading completion detecting sensor 10 and an instruction from an operating section 11, the controller 6 controls the loading motor 7 through a motor drive circuit 12, to rotate the pair of conveying rollers 4a and 4b in a forward or reverse direction; that is, to control the loading operation. When the disc 3 is at the play position, the disc detecting sensor 13 detects the presence of the disc 3.

Figure 5:
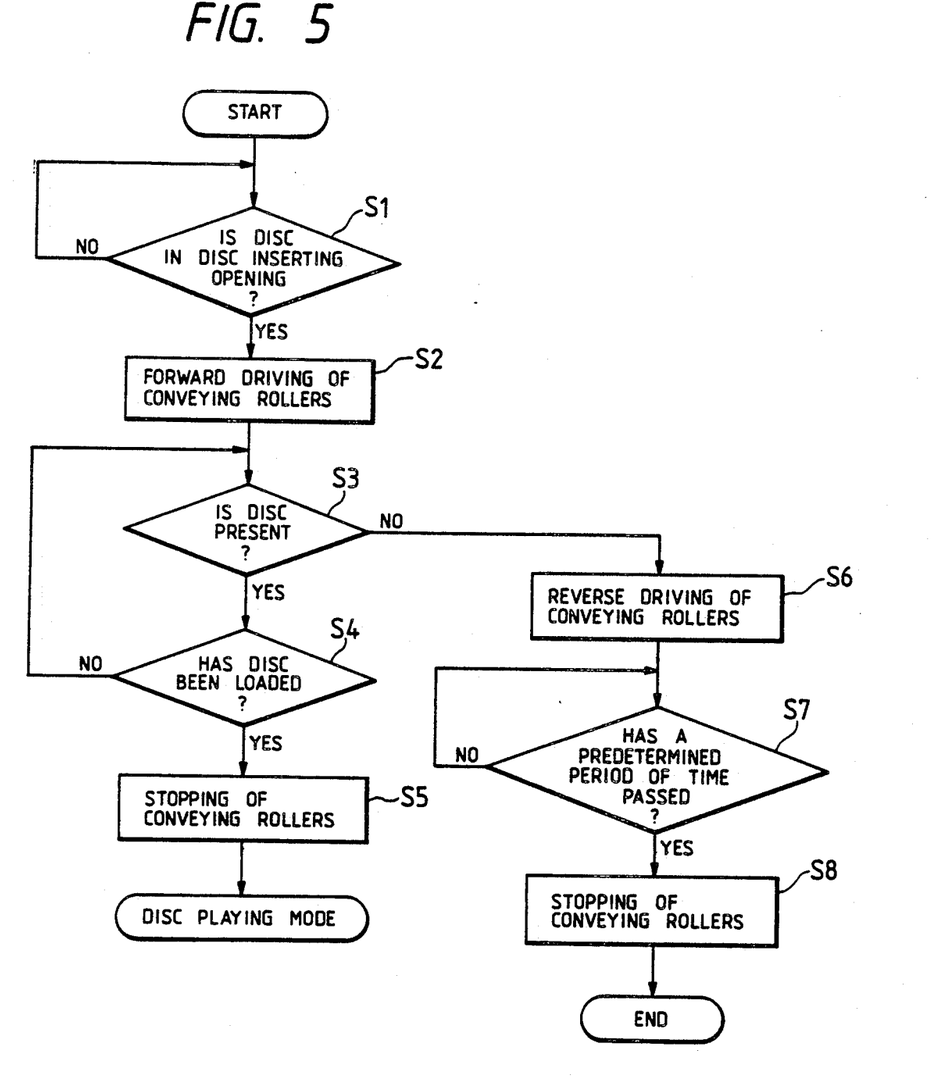
FIG. 5 is a flow chart showing the loading operation control procedure carried out by a processor in the player device illustrated in FIG. 4.

A loading operation control procedure carried out by the processor and the controller 6 according to the second embodiment of the invention may be described with reference to a flow chart of FIG. 5.

The processor senses the output of the disc detecting sensor 13, to monitor the insertion of the disc 3 into the disc insertion opening 2 (Step S1). Upon detection of the insertion of the disc 3, the processor issues an instruction to the motor drive circuit 12 to drive the pair of conveying rollers 4a and 4b in the forward direction thereby the move the disc 3 into the player body (Step S2). In this operation, the output of the disc detecting sensor 13 is continuously detected so that the presence or absence of the disc 3 is detected (Step S3); and the output of the loading completion detecting sensor 10 is detected to determine whether or not the disc 3 has been completely loaded on the turntable (Step S4). Upon detection of the output of the sensor 10, the processor applies an instruction to the motor drive circuit 12 to stop the conveying rollers 4a and 4b thereby to terminate the disc loading operation (Step S5). Under this condition, the player is operated in a disc-playing mode.

Figure 6:
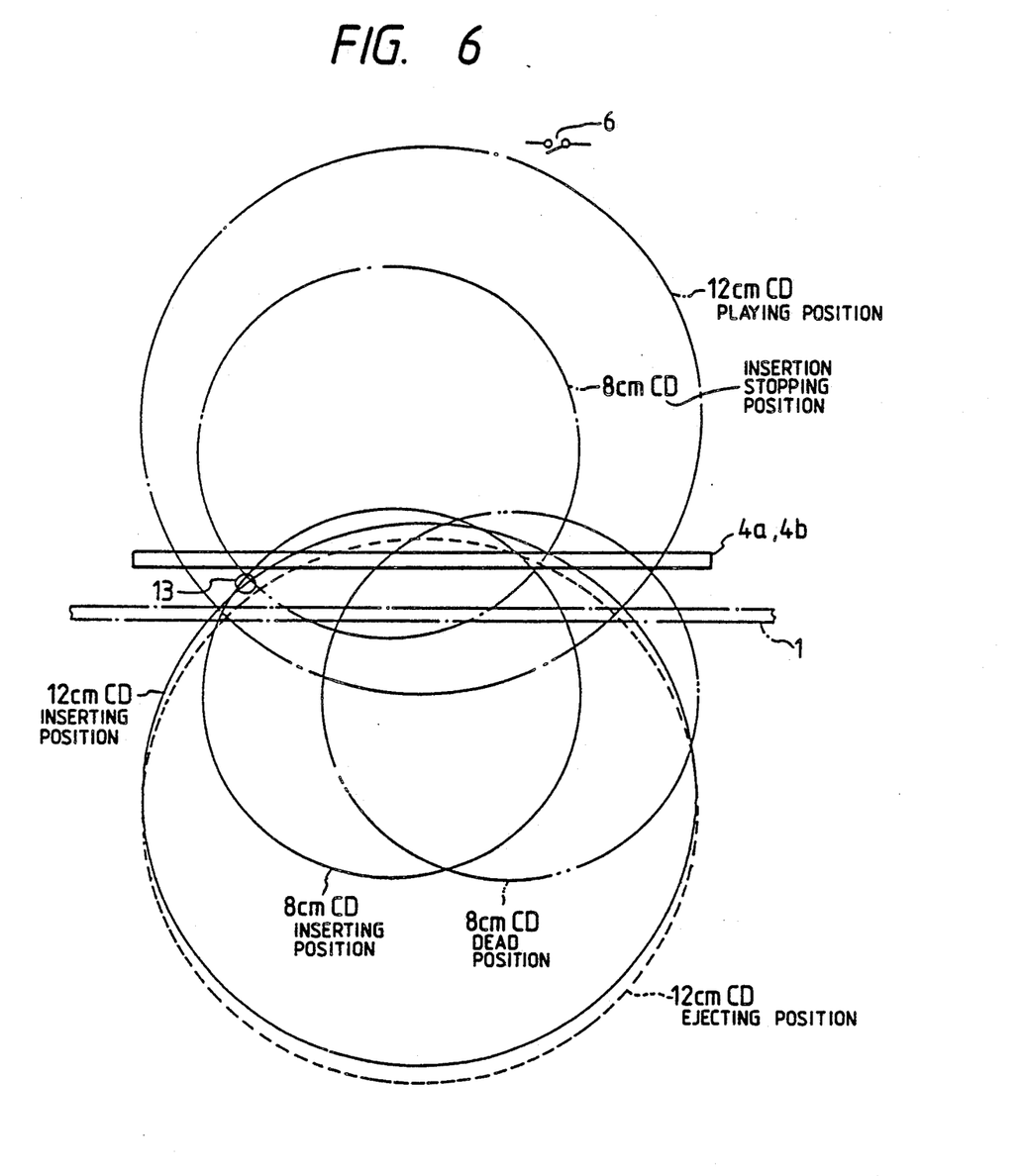
FIG. 6 is an explanatory diagram showing the positional relationships of a disc in the FIG. 4 embodiment with conveying rollers, a disc detecting sensor and a loading completion detecting sensor, in which large circles represent the positions of 12-cm CD, and small circles the positions of an 8-cm CD.

When means (not shown) provides a disc-playing completion signal indicating the fact that playing a disc has been finished, or the operating section 11 issues a disc-playing suspending instruction, the processor applies an instruction to the motor drive circuit 12 to drive the pair of conveying rollers 4a and 4b in the reverse direction, thereby to remove the disc from the disc-playing position with the above-described operation performed in the reverse order. When the disc 3 has been completely ejected such that the presence of the disc 3 is not detected by the disc detecting sensor 13, the processor applies an instruction to the motor drive circuit 12 to stop the conveying rollers 4a and 4b. FIG. 6 shows the positional relationships of the disc with the conveying rollers 4a and 4b, the disc detecting sensor 13, and the loading completion detecting sensor 10. In FIG. 6, the large circles represent the 12-cm CD; more specifically, the large circle of the solid line represents the 12-cm CD located at the insertion position beside the disc insertion opening 2, the large circle of the one-dot chain line represents the 12-cm CD at the disc-playing position; and the large circle of the broken line represents the 12-cm CD at the ejection position.

Now, the case where an 8-cm CD is inserted into the disc insertion opening 2 will be described. If the 8-cm CD is inserted into the disc insertion opening 2 in such a manner that it is away from the disc detecting sensor 13 as indicated by the small circle of the two-dot chain line in FIG. 3, then the disc detecting sensor 13 will not detect it, and therefore the loading operation is not carried out. If, on the other hand, the 8-cm CD is inserted into the disc insertion opening 2 in such a manner that it is close to the disc detecting sensor 13 as indicated by the small circle of the solid line, then the disc detecting sensor 13 can detect it, and therefore the loading operation is started; that is, it is moved into the player body similarly as in the above-described case of the 12-cm CD. In this operation, the processor detects the output of the disc detecting sensor 5, to detect the presence or absence of the disc 3 at all times (Step S3). However, since the disc is smaller in size (diameter), the detection of the presence of the disc by the disc detecting sensor 13 is ended before the loading completion detecting sensor 10 operates; i.e., detects the completion of loading the disc, and therefore the processor determines that an 8-cm CD has been inserted. In response to this determination, the processor applies the instruction to the motor drive circuit 12 to drive the pair of conveying rollers 4a and 4b in the reverse direction (Step S6), and then detects the lapse of a predetermined period the time (Step S7) and applies the instruction to the motor drive circuit 12 to stop the conveying rollers 4a and 4b (Step 8). Thus, the disc player of the invention is free from the difficulty that, when the operator has inserted an 8-cm CD thereinto by mistake, the disc cannot be ejected (or removed) therefrom.

In the above-described embodiment, when it is determined that an 8-cm CD has been inserted into the player body, the disc is ejected therefrom. However, when the presence of the disc is not detected by the disc detecting sensor 13 because it is moved to the position indicated by the small circle of the one-dot chain line in FIG. 6, a part of the disc remains outside the front panel 1 as is apparent from FIG. 6; and therefore the disc player may be so modified such that at this time instant, the disc loading operation is suspended.

According to the third embodiment of the invention, as shown in FIG. 7, a pair of disc detecting sensors 14a and 14b are provided near the disc insertion opening 2 in such a manner that they are spaced from each other by a predetermined distance L in a direction perpendicular to the direction of insertion of a disc, where the minimum distance is 8-cm. The disc detecting sensors 14a and 14b detect the completion of insertion of a disc into the disc insertion opening 2 or the completion of ejection therefrom; i.e., the sensors detect the presence or absence of a disc 3 in the disc insertion opening.

The outputs of the two disk detecting sensors 14a and 14b are applied to the controller 6 in the same manner as the disc detecting sensors of the previous embodiments. In response to the output of the disc detecting sensors 14a and 14b and the loading-completion detecting sensor 10, discussed hereinabove in regard to the previous embodiments, and based on instructions provided by the operating section 11, the controller 6 controls the loading motor 7 with the aid of the motor drive circuit 12, to rotate the conveying rollers 4a and 4b in the forward direction or in the reverse direction. When the disc 3 is at the disc-playing position, it is detected by the pair of disc detecting sensors 14a and 14b.

Figure 8:
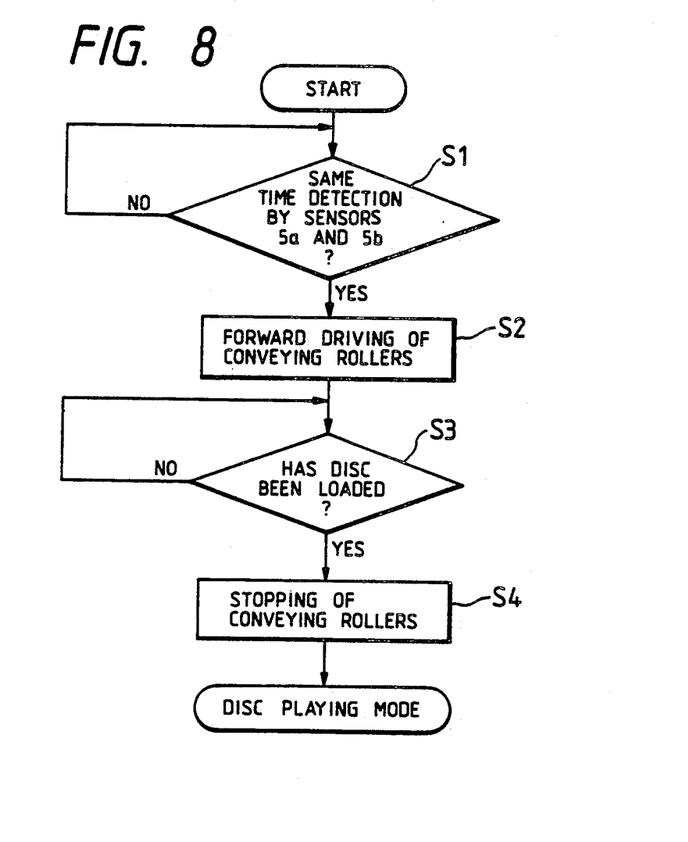
FIG. 8 is a flow chart showing the loading operation control procedure carried out by a processor in the disc player illustrated in FIG. 7.

The loading operation control procedure, according to the third embodiment will be described with reference to a flow chart of FIG. 8.

The processor operates to detect the outputs of the pair of disc detecting sensors 14a and 14b to thereby detect the insertion of the disc 3 into the disc insertion opening 2 (Step S1). When the processor detects the insertion of the disc 3 from the fact that both of the disc detecting sensors 5a and 5b are turned on simultaneously, the processor applies an instruction to the motor drive circuit to drive the conveying rollers 4a and 4b in the forward direction to move the disc 3 into the player body (Step S2). In this operation, the processor detects the output of the loading-completion detecting sensor 10 to detect when the disc is placed at the disc-playing position (Step S3). When the processor detects the completion of loading the disc 3, the processor applies an instruction to the motor drive circuit 12 to terminate the disc loading operation (Step S4). Then, the disc player is operated in a disc-playing mode.

Figure 9:
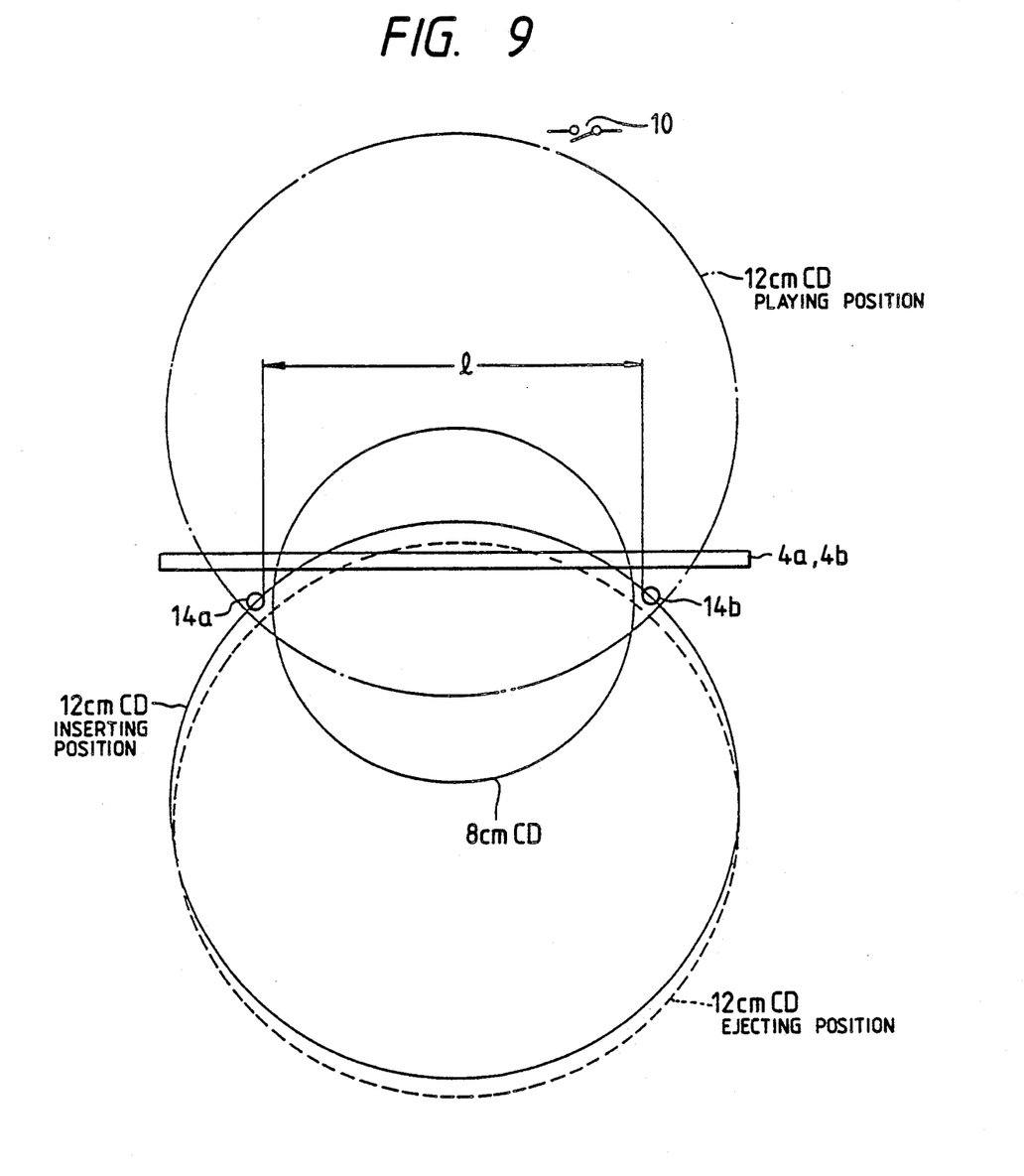
FIG. 9 is an explanatory diagram showing the positional relationships of a disc in the FIG. 7 embodiment with conveying rollers, disc detecting sensors and a loading-completion detecting sensor, in which large circles represent the positions of 12-cm CD, and a small circle the position of an 8-cm CD.

When a disc-playing completion signal is provided indicating the fact that playing a disc has been finished, or the operating section 11 issues a disc-playing suspending instruction, the processor instructs the motor drive circuit 12 to drive the pair of conveying rollers 4a and 4b in the reverse direction, thereby to remove the disc 3 from the disc-playing position with the above-described operations performed in the reverse order. When the disc 3 has been completely ejected; that is, when the presence of the disc 3 is not detected by the disc detecting sensors 14a and 14b (or by one of the two sensors 14a and 14b), the processor instructs the motor drive circuit 12 to stop the conveying rollers 4a and 4b, thus terminating the disc ejecting operation. FIG. 9 shows the positional relationships of the disc with the conveying rollers 4a and 4b, the disc detecting sensors 14a and 14b and the loading-completion detecting sensor 10. In FIG. 9, the large circles represents the 12-cm CD; more specifically, the large circle of the solid line represents the 12-cm CD located at the insertion position beside the disc insertion opening 2, the large circle of the one-dot chain line the 12-cm CD at the disc-playing position, and the large circle of the broken line the 12-cm CD at the ejection position.

Now, the case where an 8-cm CD is inserted into the disc insertion opening 2 will be described. Both in the case when the 8-cm CD is inserted into the disc insertion opening 2 in such a manner that it is close to the right or left end of the opening 2, and in the case when the disc is inserted in the disc insertion opening 2 in such a manner that it is positioned at the middle of the opening 2 as indicated by the small circle of the solid line in FIG. 9, it is impossible for the two disc detecting sensors 14a and 14b to detect the disc at the same time, because the sensors 14a and 14b are spaced at least 8-cm apart from each other as was described before. When only one of the two disc detecting sensors 14a and 14b detects the presence of the disc 3 in the disc insertion opening 2, the processor will not recognize it as the insertion of a regular disc (i.e., a 12-cm CD) and accordingly Step S2 is not effected; that is, the 8-cm CD will not be conveyed into the player body. Thus, the disc player of the invention can prevent the occurrence of the difficulty that an 8-cm CD is conveyed into the play body, and cannot be ejected therefrom.

While the invention has been described with reference to the automatic loading disc player with the disc conveying means including the conveying rollers 4a and 4b, it should be noted that the technical concept of the invention is applicable to an automatic loading disc player with other disc conveying means.

What is claimed is:

1. An automatic loading disc player for automatically detecting an attempted insertion of a data recording disc of improper size and ejecting such disc, in which conveying rollers are arranged near a disc insertion opening, and said conveying rollers are rotated in a forward direction to move a data recording disc to a disc-playing position, and are rotated in a reverse direction to move said data recording disc to said disc insertion opening therefrom, said player comprising:

first detecting means provided near said conveying rollers for detecting the presence or absence of a data recording disc;

second detecting means for detecting when a data recording disc is loaded at said disc-playing position; and control means for controlling the driving of said conveying rollers in the forward or reverse direction, said control means operating to stop the driving of said conveying rollers in the forward direction when, in loading a data recording disc, the detection of the presence of said disc by said first detecting means is interrupted before said second detecting means detects the completion of loading of said disc, wherein the interruption of a detection of said first detecting means before said second detecting means detects the completion of loading being an indication that the data recording disc is improper in size with respect to said player.

2. An automatic loading disc player as claimed in claim 1, wherein said control means operates to drive said conveying rollers in the reverse direction after stopping the driving of said conveying rollers in the forward direction.

3. An automatic loading disc player for automatically detecting an attempted insertion of a data recording disc of improper size and ejecting such disc, in which conveying rollers are arranged near a disc insertion opening, and said conveying rollers are rotated in a forward direction to move a data recording disc to a disc-playing position, and are rotated in a reverse direction to move said data recording disc to said disc insertion opening therefrom, said player comprising:
- first detecting means for detecting the presence of a data recording disc in said disc insertion opening;
- second detecting means provided near said disc insertion opening, for detecting the presence or absence of said disc;
- instructing means for issuing an instruction to move said disc to a disc-playing position; and
- control means for controlling the driving of said conveying rollers in the forward or reverse direction,
- said control means operating to drive said conveying rollers in the forward direction in response to said instruction from said instructing means when the presence of said disc is detected by said first detecting means, and to suspend the forward driving of said conveying rollers when the presence of said disc is not detected by said second detecting means for a predetermined period of time after the forward driving of said conveying means is started, wherein non-detection by said second detecting means for a predetermined period of time being an indication that the data recording disc is improper in size with respect to said player.

4. An automatic loading disc player as claimed in claim 3, wherein said control means drives said conveying rollers in the reverse direction after stopping the driving of said conveying rollers in the forward direction.

5. An automatic loading disc player for automatically detecting an attempted insertion of a data recording disc of improper size and ejecting such disc, said player comprising disc conveying means for conveying a data recording disc inserted into a disc insertion opening to a disc-playing position and conveying said disc to said disc insertion opening from said disc-playing position, comprising:
- a pair of disc detecting means arranged near said disc insertion opening in such a manner that said disc detecting means are spaced from each other by a predetermined distance in a direction perpendicular to the direction of insertion of a data recording disc for detection of the presence of a data recording disc; and
- control means for controlling said disc conveying means to convey said disc inserted into said disc insertion opening to said disc-playing position and to convey said disc to said disc insertion opening from said disc-playing position,
- said control means operating to cause said disc conveying means to convey said disc inserted into said disc insertion opening to said disc-playing position only when said pair of disc detecting means simultaneously detect the presence of said disc, wherein non-simultaneous detection by said pair of disc detecting means being as indication that the data recording disc is improper in size with respect to said player.

6. An automatic loading disc player as claimed in claim 5, wherein said disc conveying means comprises conveying rollers provided near said disc insertion opening.

* * * * *